United States Patent
Chang

(10) Patent No.: US 9,992,969 B2
(45) Date of Patent: Jun. 12, 2018

(54) LABORATORY ANIMAL BREEDING APPARATUS

(71) Applicant: ORIENT Inc., Gyeonggi-do (KR)

(72) Inventor: Jae Jin Chang, Seoul (KR)

(73) Assignee: ORIENT Inc., Gyeonggi-Do (KR)

( * ) Notice: Subject to any disclaimer, the term of this patent is extended or adjusted under 35 U.S.C. 154(b) by 111 days.

(21) Appl. No.: 14/967,428

(22) Filed: Dec. 14, 2015

(65) Prior Publication Data

US 2016/0174519 A1 Jun. 23, 2016

(30) Foreign Application Priority Data

Dec. 18, 2014 (KR) ........................ 10-2014-0182886

(51) Int. Cl.
*A01K 1/03* (2006.01)
*A01K 1/035* (2006.01)
*A01K 1/00* (2006.01)

(52) U.S. Cl.
CPC ............ *A01K 1/031* (2013.01); *A01K 1/0047* (2013.01); *A01K 1/0356* (2013.01)

(58) Field of Classification Search
CPC .. A01K 1/0047; A01K 1/0052; A01K 1/0058; A01K 1/0064; A01K 1/031; A01K 1/0356
USPC .................................. 119/417, 418, 419, 420
See application file for complete search history.

(56) References Cited

U.S. PATENT DOCUMENTS

| | | | |
|---|---|---|---|
| 6,041,741 A | 3/2000 | Gabriel et al. | |
| 2002/0069834 A1* | 6/2002 | Deitrich | A01K 1/031 119/419 |
| 2005/0028751 A1* | 2/2005 | Strzempko | A01K 1/031 119/496 |
| 2006/0254528 A1* | 11/2006 | Malnati | A01K 1/031 119/419 |
| 2006/0278171 A1* | 12/2006 | Conger | A01K 1/0356 119/419 |
| 2007/0193527 A1 | 8/2007 | Verhage et al. | |
| 2010/0307497 A1* | 12/2010 | Busch | A61M 16/0816 128/204.18 |
| 2012/0312245 A1* | 12/2012 | Lin | A01K 1/031 119/417 |

FOREIGN PATENT DOCUMENTS

| | | |
|---|---|---|
| AU | 2011101161 A4 | 11/2011 |
| EP | 1 719 406 A1 | 11/2006 |
| JP | 2005-525796 A | 9/2005 |
| JP | 2006-311863 A | 11/2006 |
| JP | 2008-527975 A | 7/2008 |
| JP | 2011-200258 A | 10/2011 |
| JP | 3171922 U | 11/2011 |

* cited by examiner

*Primary Examiner* — Marc Burgess
*Assistant Examiner* — Brady W Frazier
(74) *Attorney, Agent, or Firm* — Renner, Otto, Boisselle & Sklar, LLP

(57) ABSTRACT

A laboratory animal breeding apparatus includes a case having a breeding space in which an experimental animal is bred; a cover covering an open upper portion of the case; and a filter separably provided on an opening portion formed in the cover or the case, and purifying air flowing into the breeding space.

27 Claims, 13 Drawing Sheets

LABORATORY ANIMAL BREEDING APPARATUS

CROSS-REFERENCE TO RELATED APPLICATION

This application claims the priority and benefit of Korean Patent Application No. 10-2014-0182886 filed on Dec. 18, 2014, with the Korean Intellectual Property Office, the disclosure of which is incorporated herein by reference.

BACKGROUND

The present disclosure relates to a laboratory animal breeding apparatus for breeding a laboratory animal, such as an experimental rodent or the like, and, more particularly, to a laboratory animal breeding apparatus including a filter separably provided on an opening portion of a cover or a case of the laboratory animal breeding apparatus.

A purpose of a laboratory animal breeding apparatus is to breed an experimental animal, such as an experimental rodent or the like.

Such a laboratory animal breeding apparatus may have a breeding space in which an experimental animal may be bred. The laboratory animal breeding apparatus may maintain animal comfort by circulating air in the breeding space suitable for breeding an experimental animal through the breeding space being connected to air conditioning equipment or the like or by an air conditioning system or the like.

However, unless air conditioning equipment or the like provided in a conventional laboratory animal breeding apparatus works, air in a breeding space thereof may not be circulated, and thus an experimental animal may expire.

The conventional laboratory animal breeding apparatus is also inconvenient since elements thereof may be required to be separated or disassembled in order to remove an experimental animal from the breeding space, insert an experimental animal thereinto, or to treat an experimental animal therein.

It may also be difficult to connect a conventional laboratory animal breeding apparatus to an air conditioning system or the like.

Furthermore, a feed container having a single shape may be provided to insert experimental animal feed thereinto.

SUMMARY

The present disclosure has been made in response to at least one of the requirements or problems occurring in the related art as described above.

An aspect of the present disclosure may keep an experimental animal from expiring in the case that air conditioning equipment or the like for circulating air to keep air in a breeding space of a laboratory animal breeding apparatus fresh malfunctions.

Another aspect of the present disclosure may allow an experimental animal to be easily inserted into a laboratory animal breeding apparatus, removed from the laboratory animal breeding apparatus, and treated.

Another aspect of the present disclosure may allow a laboratory animal breeding apparatus to be easily connected to an air conditioning system or the like.

Another aspect of the present disclosure may provide a feed container having various shapes.

According to an aspect of the present disclosure, a laboratory animal breeding apparatus may include: a case having a breeding space in which an experimental animal is bred; a cover covering an open upper portion of the case; and a filter separably provided on an opening portion formed in the cover or the case, and purifying air flowing into the breeding space.

In this case, the opening portion may be formed in the cover.

The filter may also be rotatably provided on the opening portion.

The filter may include: a first filter support member rotatably and separably provided on the opening portion; a second filter support member below the first filter support member; and a filter member between the first and second filter support members.

The first and second filter support members may also have passage holes through which air passes, respectively.

The second filter support member may be rotatably provided on the first filter support member.

A lower portion of the first filter support member may also have an insertion portion into which the second filter support member is inserted to overlap the first filter support member through being revolved.

The first filter support member may include an opening portion fastening member sealing a space between the first filter support member and the opening portion outside of the insertion portion.

The opening portion fastening member may also pass through at least a portion of the first filter support member to be provided on the first filter support member.

The first filter support member may have through holes outside of the insertion portion, and the opening portion fastening member may include an upper fastening portion provided on an upper portion of the first filter support member, a lower fastening portion provided on a lower portion of the first filter support member, and connection portions connected to the upper and lower fastening portions, and passing through the through holes, respectively.

The cover may also have a water supply portion into which a water bottle is inserted to supply water to an experimental animal.

The water supply portion may have a water supply hole into which a water injection nozzle of the water bottle is inserted, and a rotary opening and closing member opening and closing the water supply hole may be rotatably provided on the water supply portion adjacent to the water supply hole.

An elastic member providing elastic force to the rotary opening and closing member may also be provided on the water supply portion adjacent to the water supply hole.

A gap sealing member sealing a gap between the water injection nozzle and the water supply hole may be provided on a portion of the water bottle adjacent to the water injection nozzle when the water injection nozzle is inserted into the water supply hole.

The cover or the case may also have clamping members rotatably provided to couple the cover to the case.

The case and the cover may have a sealing member provided therebetween.

The cover or the case may also have air flow portions respectively connected to an air supply source and an air discharge source to supply fresh air to the breeding space or discharge contaminated air present in the breeding space.

The air flow portions may be formed on the cover.

In addition, each of the air flow portions may have a flow-hole, and the flow-hole may have a valve opening and closing the flow-hole.

The valve may have a movable opening and closing member movably provided in the flow-hole to open and close the flow-hole.

The movable opening and closing member may also include an opening and closing portion opening and closing the flow-hole, and a movable portion movably provided in the flow-hole.

The opening and closing portion may have a truncated cone or circular cone shape.

The flow-hole may also include a guide hole into which the movable opening and closing member is inserted so as to guide movement of the movable opening and closing member, and a guide portion in which an air cavity through which air passes is formed.

The valve may further include a guide member having a fitting hole to which an end portion of the movable opening and closing member is fitted, and having an air hole through which air passes; and an elastic member between the guide portion and the guide member.

The flow-hole may also have a linking portion inserted thereinto, the linking portion provided on an air conditioning system including the air supply source and the air discharge source.

Each of the air flow portions may have a first magnetic force generating member generating magnetic force, and a second magnetic force generating member corresponding to the first magnetic force generating member may be provided in a location of the linking portion corresponding to a location of the first magnetic force generating member.

The laboratory animal breeding apparatus may further include a feed container provided in the breeding space to be spaced apart from a bottom surface of the case at a predetermined interval and configured to allow experimental animal feed to be inserted thereinto.

The feed container may be provided below the opening portion.

At least a portion of the feed container may also have a mesh form.

A cross section of the feed container may have a quadrangular shape having a wide upper end and a narrow lower end.

An upper end portion of the feed container may also be installed on the opening portion.

Holding portions may be formed on the upper end portion of the feed container, and grooves on which the holding portions are hung may be formed in the opening portion.

The feed container may also have a horizontally-extending portion extending horizontally from the upper end portion of the feed container, and a vertically-extending portion extending vertically from the horizontally-extending portion.

The upper end portion and horizontally-extending portion of the feed container may be installed on an upper end portion of the case.

The holding portions may be formed in the upper end portion and horizontally-extending portion of the feed container, respectively, and insertion grooves on which the holding portions are hung may be formed in the upper end portion of the case.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
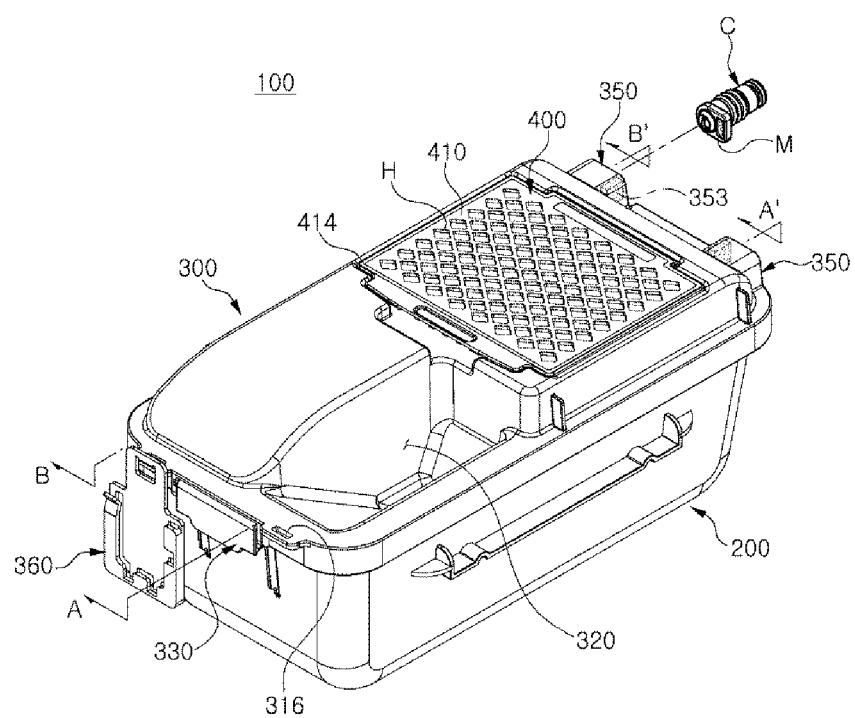
FIG. 1 is a front perspective view of a laboratory animal breeding apparatus according to an exemplary embodiment in the present disclosure.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a member, hole, or groove, is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted as one or a combination thereof.

The contents of the present inventive concept described below may have a variety of configurations and propose only a required configuration herein, but are not limited thereto.

Hereinafter, a laboratory animal breeding apparatus according to an exemplary embodiment in the present disclosure will be described with reference to FIGS. 1 through 14.

Figure 2:
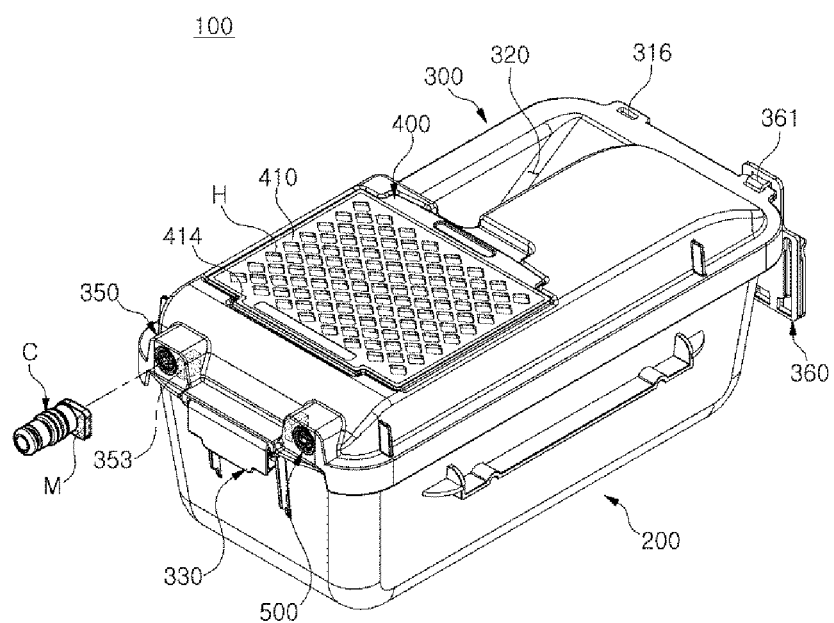
FIG. 2 is a rear perspective view of a laboratory animal breeding apparatus according to an exemplary embodiment in the present disclosure.
Figure 3:
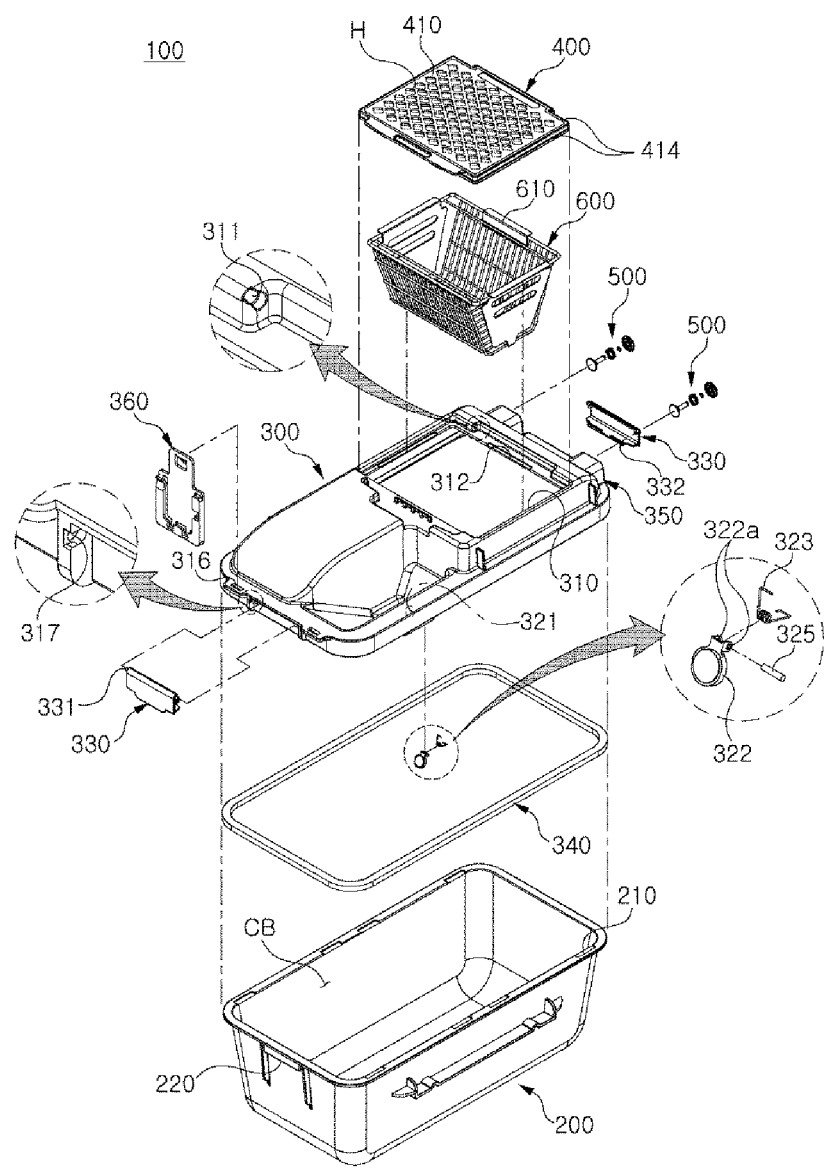
FIG. 3 is an exploded perspective view of a laboratory animal breeding apparatus according to an exemplary embodiment in the present disclosure.

FIG. 1 is a front perspective view of a laboratory animal breeding apparatus according to an exemplary embodiment in the present disclosure. FIG. 2 is a rear perspective view of a laboratory animal breeding apparatus according to an exemplary embodiment in the present disclosure. FIG. 3 is an exploded perspective view of a laboratory animal breeding apparatus according to an exemplary embodiment in the present disclosure.

Figure 4:
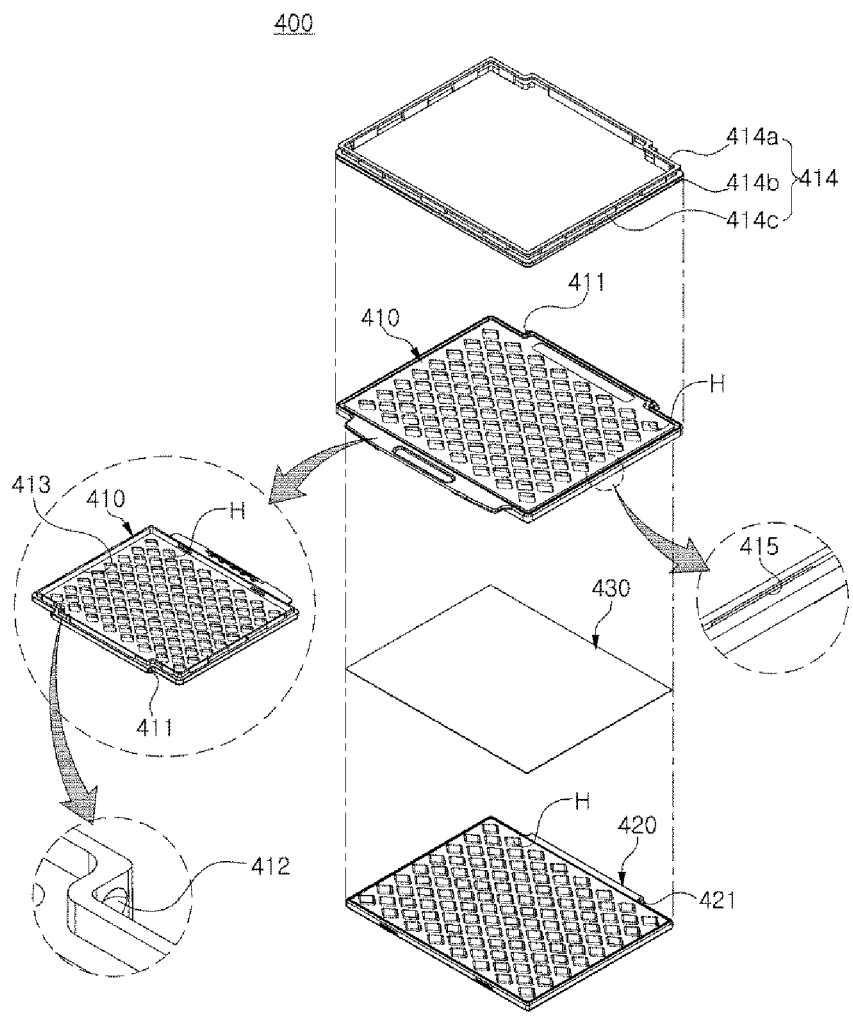
FIG. 4 is an exploded perspective view of a filter of a laboratory animal breeding apparatus according to an exemplary embodiment in the present disclosure.
Figure 5:
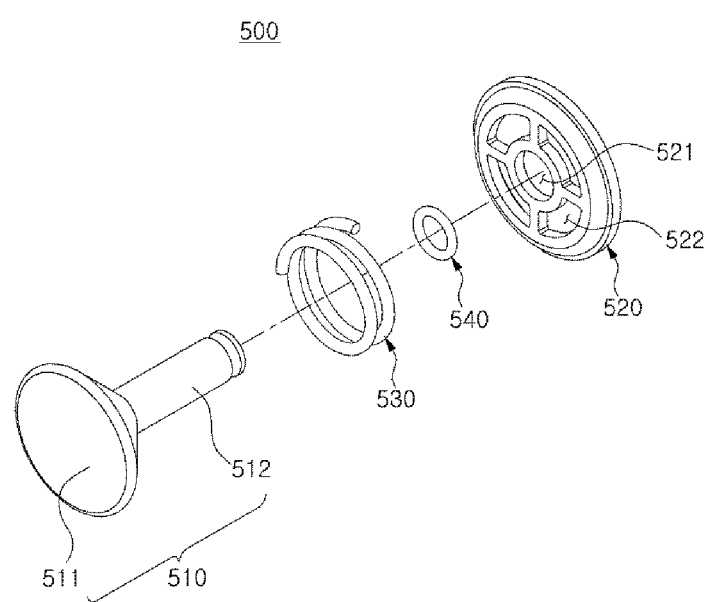
FIG. 5 is an exploded perspective view of a valve of a laboratory animal breeding apparatus according to an exemplary embodiment in the present disclosure.

FIG. 4 is an exploded perspective view of a filter of a laboratory animal breeding apparatus according to an exemplary embodiment in the present disclosure. FIG. 5 is an exploded perspective view of a valve of a laboratory animal breeding apparatus according to an exemplary embodiment in the present disclosure.

Figure 6:
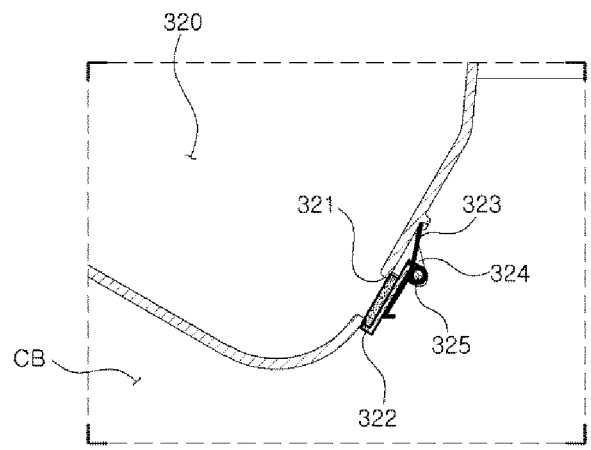
FIGS. 6 and 7 are portions of cross-sectional views taken along line A-A' of FIG. 1, respectively, and illustrate inserting a water bottle into a water supply portion formed in a cover of a laboratory animal breeding apparatus according to an exemplary embodiment in the present disclosure.
Figure 7:
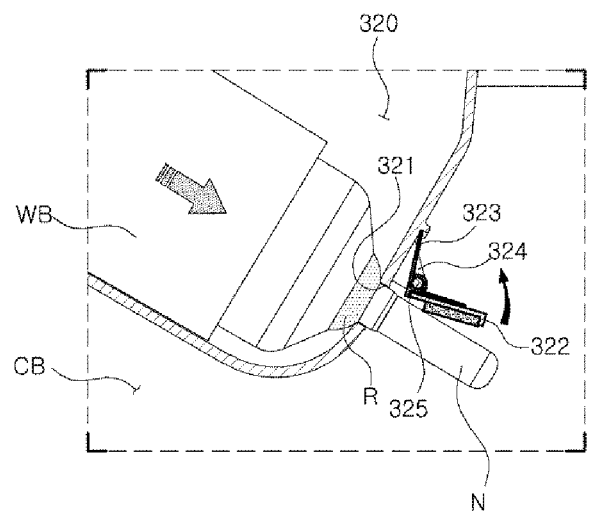
Figure 8:
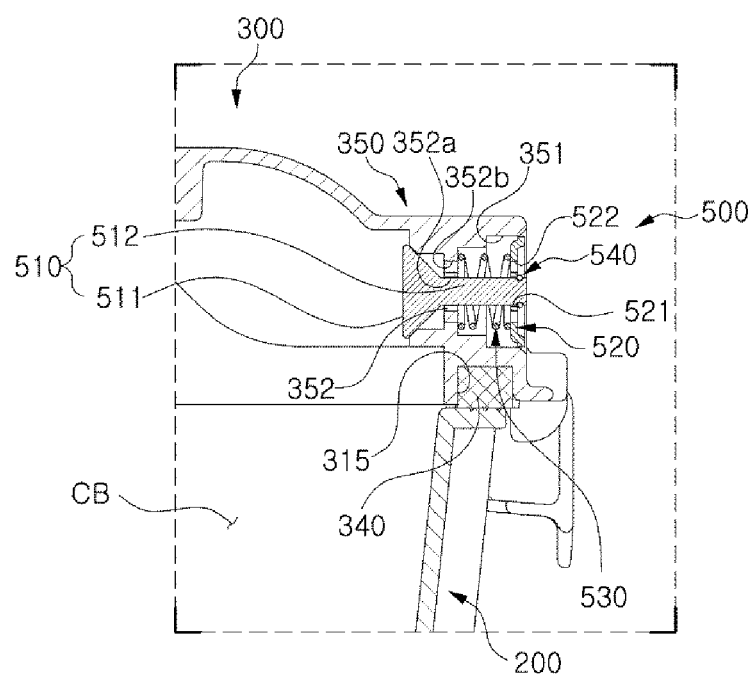
FIGS. 8 and 9 are portions of cross-sectional views taken along line B-B' of FIG. 1, respectively, and illustrate connecting a linking portion of an air conditioning system to a flow-hole formed in a cover of a laboratory animal breeding apparatus according to an exemplary embodiment in the present disclosure.
Figure 9:
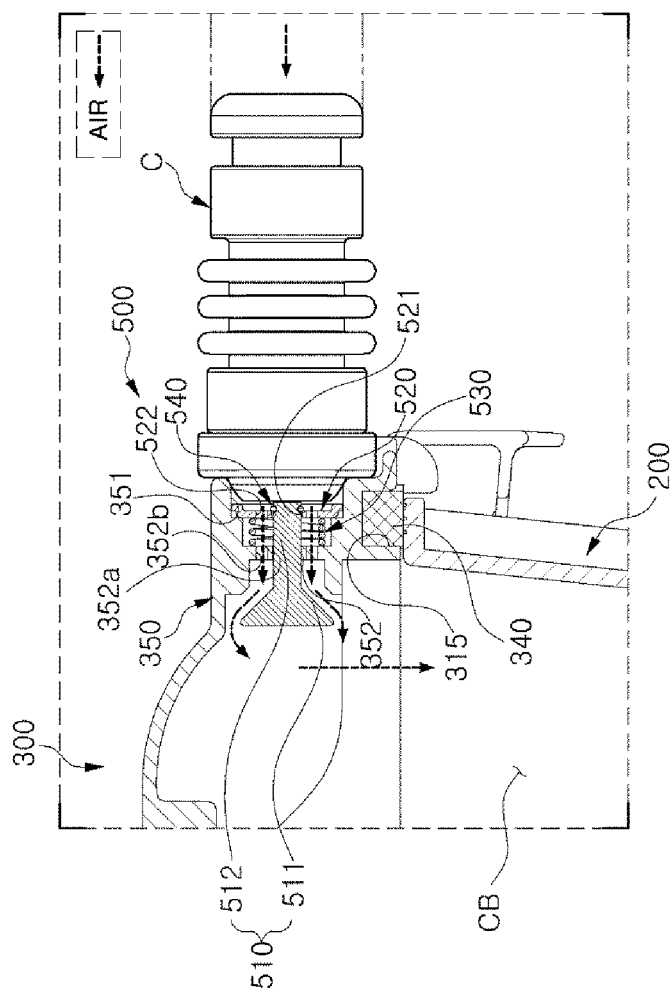

FIGS. 6 and 7 are portions of cross-sectional views taken along line A-A' of FIG. 1, respectively, and illustrate inserting a water bottle into a water supply portion formed in a cover of a laboratory animal breeding apparatus according to an exemplary embodiment in the present disclosure. FIGS. 8 and 9 are portions of cross-sectional views taken along line B-B' of FIG. 1, respectively, and illustrate connecting a linking portion of an air conditioning system to a flow-hole formed in a cover of a laboratory animal breeding apparatus according to an exemplary embodiment in the present disclosure.

Figure 10:
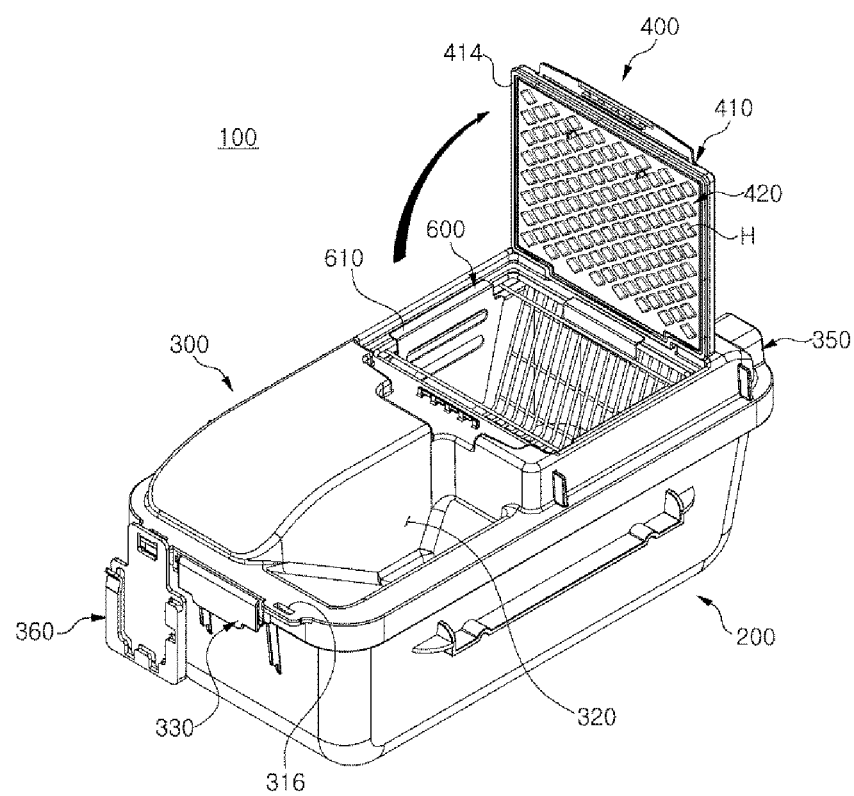
FIG. 10 is a perspective view illustrating revolving a filter of a laboratory animal breeding apparatus according to an exemplary embodiment in the present disclosure.
Figure 11:
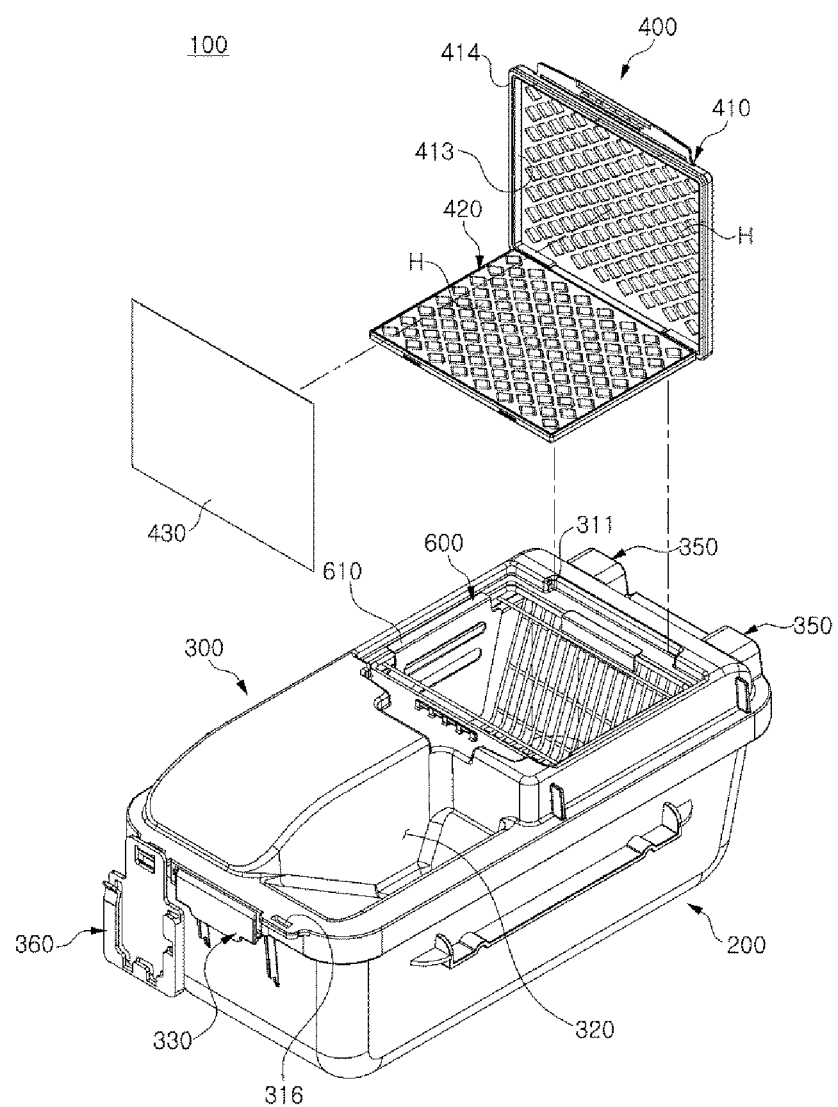
FIG. 11 is a perspective view illustrating separating a filter of a laboratory animal breeding apparatus from an opening portion of a cover according to an exemplary embodiment in the present disclosure.
Figure 12:
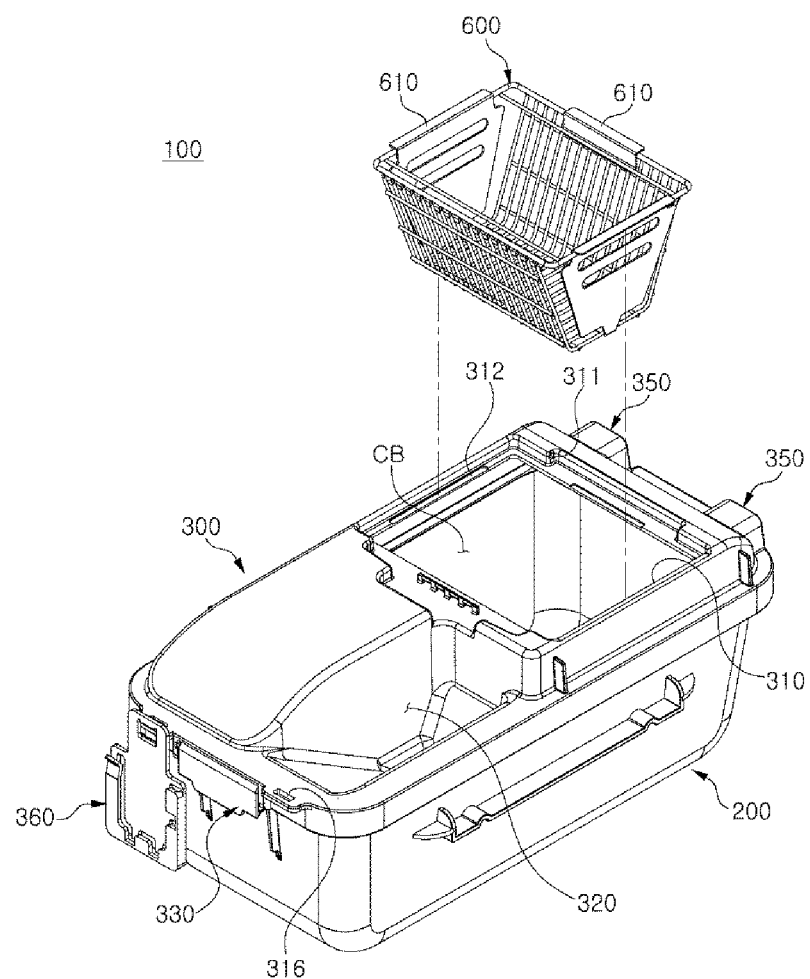
FIG. 12 is a perspective view illustrating separating a feed container from an opening portion of a cover of a laboratory animal breeding apparatus according to an exemplary embodiment in the present disclosure.

FIG. 10 is a perspective view illustrating revolving a filter of a laboratory animal breeding apparatus according to an exemplary embodiment in the present disclosure. FIG. 11 is a perspective view illustrating separating a filter of a laboratory animal breeding apparatus from an opening portion of a cover according to an exemplary embodiment in the present disclosure. FIG. 12 is a perspective view illustrating separating a feed container from an opening portion of a cover of a laboratory animal breeding apparatus according to an exemplary embodiment in the present disclosure.

Figure 13A:
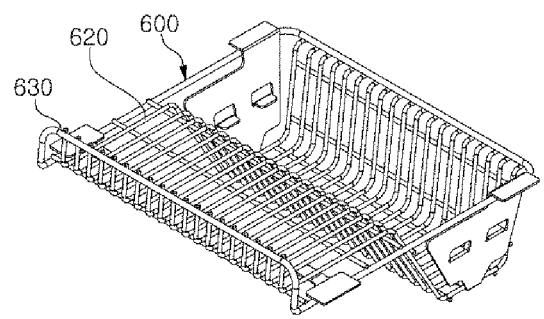
FIGS. 13A and 13B are perspective views respectively illustrating other examples of a feed container of a laboratory animal breeding apparatus according to an exemplary embodiment in the present disclosure.
Figure 13B:
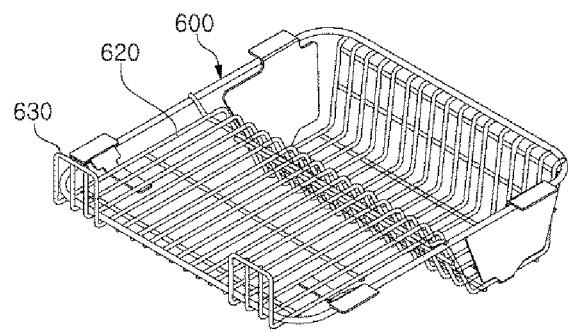
Figure 14:
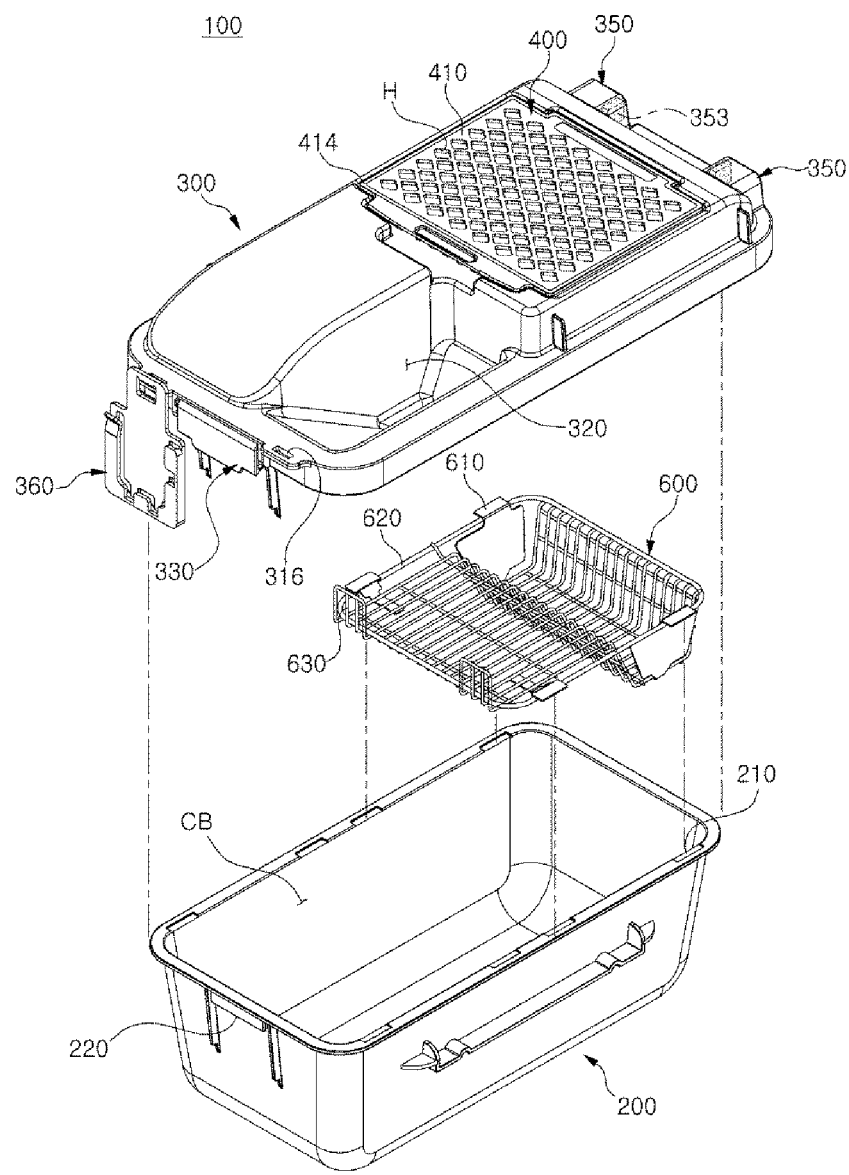
FIG. 14 is a perspective view illustrating installing another example of a feed container of a laboratory animal breeding apparatus in a case according to an exemplary embodiment in the present disclosure.

FIGS. 13A and 13B are perspective views respectively illustrating other examples of a feed container of a laboratory animal breeding apparatus according to an exemplary embodiment in the present disclosure. FIG. 14 is a perspective view illustrating installing another example of a feed container of a laboratory animal breeding apparatus to a case according to an exemplary embodiment in the present disclosure.

A laboratory animal breeding apparatus according to an exemplary embodiment in the present disclosure may include a case 200 and a cover 300.

Case

The case 200 may have a breeding space CB formed therein. The breeding space CB of the case 200 may allow an experimental animal, such as an experimental rodent, to be bred.

The case 200 may have an open upper portion as illustrated in FIG. 3, and may have a tub shape in which a breeding space CB is formed. However, the case 200 is not limited to a certain shape, and may have any well-known shape in which a breeding space CB is formed.

As illustrated in FIG. 3, an upper end portion of the case 200 may have insertion grooves 210 formed therein. The insertion grooves 210 may allow holding portions 610 to be hung therein as respectively illustrated in FIGS. 13A and 13B, the holding portions 610 being respectively formed on an upper end portion of a feed container 600 and a horizontally-extending portion 620 extending horizontally from the upper end portion of the feed container 600.

This may allow the feed container 600 to be installed in the upper end portion of the case 200, the feed container 600 including the horizontally-extending portion 620, and a vertically-extending portion 630 extending vertically from the horizontally-extending portion 620 as respectively illustrated in FIGS. 13A and 13B.

The case 200 may include locking jaws 220 as illustrated in FIG. 3. The locking jaws 220 may allow locking portions 332 to be locked thereto, the locking portions 332 respectively formed on clamping members 330, which are rotatably provided on the cover 300. This may allow the cover 300 to be coupled to the case 200.

Cover

The cover 300 may cover the open upper portion of the case 200.

The cover 300 may include the clamping members 330 rotatably provided thereon. To this end, the cover 300 may have rotation support grooves 317 formed therein, and each of the clamping members 330 may have rotary projections 331 formed thereon to be respectively inserted into the rotation support grooves 317 of the cover 300.

However, the present disclosure is not limited to a certain configuration in which the clamping members 330 are rotatably provided on the cover 300, and may have any well-known configuration.

The clamping members 330 may allow the cover 300 to be coupled to the case 200. To this end, the cover 200 may include the locking jaws 220 formed thereon, and the clamping members 330 may include the locking portions 332 formed thereon to be locked to the locking jaws 220 of the case 200, respectively.

As described above, coupling the cover 300 to the case 200 by the clamping members 330 is explained with an example in which the clamping members 330 are rotatably provided on the cover 300 and the locking jaws 220 are provided on the case 200.

Although not illustrated in the drawings, the cover 300 may also be coupled to the case 200 by the clamping members 330 rotatably provided on the case 200 and the locking jaws 220 provided on the cover 300.

A sealing member 340 may be provided between the case 200 and the cover 300. This may allow a space between the case 200 and the cover 300 to be sealed with the sealing member 340 when the cover 300 is coupled to the case 200 by the clamping members 330 as described above.

The cover 300 may have an opening portion 310 formed therein. A filter 400 may be separably provided on the opening portion 310 of the cover 300.

The opening portion 310 of the cover 300 may have first rotation support grooves 311 formed therein and each having an open side. The first rotation support grooves 311 of the opening portion 310 may allow first rotary projections 411 to be respectively inserted into the first rotation support grooves 311, the first rotary projections 411 formed on a first filter support member 410 included in the filter 400 below. Each of the first rotary projections 411 of the first filter support member 410 may be inserted into each of the first rotation support grooves 311 through the open side of each of the first rotation support grooves 311.

This may allow the first filter support member 410 to be rotatably and separably provided on the opening portion 310.

The opening portion 310 of the cover 300 may have grooves 312 formed therein. The grooves 312 of the opening portion 310 may allow the holding portions 610 to be hung on the grooves 312, the holding portions 610 formed on the upper end portion of the feed container 600 having a configuration as illustrated in FIG. 3 and described below.

This may allow the feed container 600 having the configuration as illustrated in FIG. 3 to be installed on the opening portion 310 of the cover 300.

The cover 300 may have a sealing member insertion groove 315 formed therein. The aforementioned sealing member 340 may be inserted into the sealing member insertion groove 315 of the cover 300, and may seal a space between the case 200 and the cover 300.

Alternatively, the sealing member insertion groove 315 may be formed in the case 200 to seal a space between the case 200 and the cover 300 when the sealing member 340 is inserted into the sealing member insertion groove 315.

The cover 300 may have hanger holes 316 formed therein. A hanger portion 361 of a labeling member 360 may be inserted into the hanger hole 316 of the cover 300 to be hung thereon.

This may allow the labeling member 360 to be provided on the cover 300, and a label (not shown), on which a name, conditions, experimental information or experiment progress of an experimental animal may be recorded, to be attached thereto.

The cover 300 may have the rotation support grooves 317 formed therein such that the rotary projections 331 of the clamping members 330 are inserted into the rotation support grooves 317. Therefore, the clamping members 330 may be rotatably provided on the opening portion 300.

The cover 300 may have a water supply portion 320 formed therein. The water supply portion 320 may allow a water bottle WB to be inserted thereinto as illustrated in FIG. 7. This may allow an experimental animal in the breeding space CB of the case 200 to be supplied with water.

The water supply portion 320 may have a water supply hole 321 formed therein. As the water bottle WB is inserted into the water supply portion 320, a water injection nozzle N of the water bottle WB may be inserted into the water supply hole 321.

Therefore, since the water injection nozzle N of the water bottle WB may be positioned in the breeding space CB of the case 200, an experimental animal may be supplied with water stored in the water bottle WB through the water injection nozzle N.

The water supply portion 320 adjacent to the water supply hole 321, that is, the water supply portion 320 on a breeding space CB side, may include a rotary opening and closing member 322 rotatably provided thereon.

To this end, the water supply portion 320 adjacent to the water supply hole 321 may have a pair of rotation support portions 324 in which rotation support grooves (not shown) each having an open side are respectively formed. The rotary opening and closing member 322 may have a pair of shaft member holes 322a (see FIG. 3) formed therein.

By allowing a shaft member 325 to pass through the shaft member holes 322a (see FIG. 3) of the rotary opening and closing member 322 to be inserted into the rotation support grooves of the rotation support portions 324, the rotary opening and closing member 322 may be rotatably provided on the water supply portion 320 adjacent to the water supply hole 321.

However, the present disclosure is not limited to a configuration in which the rotary opening and closing member 322 is rotatably provided, and may have any well-known configuration, as long as rotary projections formed on the rotary opening and closing member 322 can be inserted into the rotation support grooves formed in the rotation support portions 324.

The water supply portion 320 adjacent to the water supply hole 321 may include an elastic member 323 formed thereon to provide elastic force to the rotary opening and closing member 322 in a direction to which the water supply hole 321 is closed.

Therefore, as illustrated in FIG. 7, only when the water bottle WB is inserted into the water supply portion 320, the rotary opening and closing member 322 may be opened by the water injection nozzle N of the water bottle WB.

Unless the water bottle WB is inserted into the water supply portion 320, the rotary opening and closing member 322 may be closed by elastic force of the elastic member 323 as illustrated in FIG. 6. This may allow external air not to flow into the breeding space CB of the case 200 through the water supply hole 321 of the water supply portion 320.

A portion of the water bottle WB adjacent to the water injection nozzle N may also include a gap sealing member R provided thereon as illustrated in FIG. 7. Therefore, when the water injection nozzle N is inserted into the water supply hole 321, a gap between the water injection nozzle N and the water supply hole 321 may be sealed, and external air may be prevented from flowing into the breeding space CB of the case 200 through the gap between the water injection nozzle N and the water supply hole 321.

Filter

A laboratory animal breeding apparatus 100 according to an exemplary embodiment in the present disclosure may further include the filter 400.

The filter 400 may be separably provided on the aforementioned opening portion 310 formed in the cover 300.

Therefore, as illustrated in FIG. 11, the filter 400 may be separated from the opening portion 310, such that the feed container 600 installed on the opening portion 310 may be provided with a feed.

When the feed container 600 is separated from the opening portion 310 as illustrated in FIG. 12 in such a state, an experimental animal in the breeding space CB may be taken out through the opening portion 310, inserted into the breeding space CB, and easily treated.

The filter 400 may purify air flowing into the breeding space CB of the case 200.

In particular, if an air supply source (not shown) or an air discharge source (not shown) connected to air flow portions 350 formed on the cover 300 does not work, external air may flow into the breeding space CB through the filter 400.

As such, since external air flows into the breeding space CB through the filter 400, air filtered and purified by the filter 400 may flow into the breeding space CB.

Therefore, even when the air supply source or air discharge source does not work, an experimental animal in the breeding space CB may not die.

The filter 400 may be rotatably provided on the opening portion 310. Therefore, as illustrated in FIG. 10, the feed container 600 may be provided with a feed by only revolving the filter 400 without separating the filter 400 from the opening portion 310.

The filter 400 may include the first filter support member 410, a second filter support member 420, and a filter member 430 as illustrated in FIG. 4.

The first filter support member 410 may be rotatably and separably provided on the aforementioned opening portion 310 of the cover 300. To this end, the first filter support member 410 may have the first rotary projections 411 formed thereon, and the first rotary projections 411 of the first filter support member 410 may be respectively inserted into the first rotation support grooves 311 through open sides of the aforementioned first rotation support grooves 311, respectively.

The first filter support member 410 may also have second rotation support grooves 412 formed therein. Second rotary projections 421 formed on the second filter support member 420 may be inserted into the second rotation support grooves 412 of the first filter support member 410, respectively.

An insertion portion 413 may be formed on a lower portion of the first filter support member 410. The second filter support member 420 may be inserted into the insertion portion 413 to overlay the first filter support member 410.

An opening portion fastening member 414 may also be provided on the first filter support member 410 outside of the insertion portion 413. The opening portion fastening member 414 may seal a space between the first filter support member 410 and the opening portion 310 when the first filter support member 410 is provided on the opening portion 310 of the cover 300.

The opening portion fastening member 414 may be provided on the first filter support member 410 by passing through at least a portion of the first filter support member 410.

To this end, through holes 415 may be formed in the first filter support member 410 outside of the insertion portion 413. The opening portion fastening member 414 may also include an upper fastening portion 414a, a lower fastening portion 414b, and connection portions 414c.

The upper fastening portion 414a of the opening portion fastening member 414 may be provided on an upper portion of the first filter support member 410. The lower fastening portion 414b may also be provided on a lower portion of the first filter support member 410. The connection portions 414c may be connected to the upper fastening portion 414a and the lower fastening portion 414b, respectively, and may pass through the through holes 415, respectively.

The opening portion fastening member 414 may be provided to pass through at least a portion of the first filter support member 410, for example, by dual injection. For example, after the first filter support member 410 is formed by first injection molding, the opening portion fastening member 414 may be provided to pass through at least a portion of the first filter support member 410 by second injection molding.

Therefore, when the filter 400 is provided on the opening portion 310 of the cover 300, a space between the filter 400 and the opening portion 310 of the cover 300 may be tightly sealed.

The first filter support member 410 may have passage holes H formed therein such that external air may pass through the passage holes H of the first filter support member 410.

The second filter support member 420 may be provided below the first filter support member 410. This may allow the filter member 430 to be provided between the first and second filter support members 410 and 420.

The second filter support member 420 may be rotatably provided on the first filter support member 410. This may allow the filter member 430 provided between the first and second filter support members 410 and 420 to be easily replaced as illustrated in FIG. 11. For example, rotating the second filter support member 420 on the first filter support member 410 may allow the filter member 430 provided between the first and second filter support members 420 to be easily replaced.

To this end, the second rotary projections 421 respectively inserted into the aforementioned second rotation support grooves 412 of the first filter support member 410 may be formed on the second filter support member 420. However, the present disclosure is not limited to a certain configuration in which the second filter support member 420 is rotatably provided on the first filter support member 410, and may have any well-known configuration.

The second filter support member 420 may also have passage holes H. This may allow external air passing through the passage holes H of the first filter support member 410 to pass through the passage holes H of the second filter support member 420 through the filter member 430, thus flowing into the breeding space CB of the case 200.

The filter member 430 may be provided between the first and second filter support members 410 and 420. External air passing through the passage holes H of the first filter support member 410 may be filtered and purified while passing through the filter member 430, and may flow into the breeding space CB of the case 200 through the passage holes H of the second filter support member 420. Therefore, the purified air may flow into the breeding space CB of the case 200.

The filter member 430 is not limited to a certain configuration, and may have any well-known configuration in which air passing through the passage holes H of the first filter support member 410 may be filtered and purified.

Although it has been described that the opening portion 310 on which the filter 400 is separably provided is formed in the cover 300, the opening portion 310 on which the filter 400 is separably provided may even be formed in the case 200.

Air Flow Portion and Valve

The air flow portions 350 may be formed on the cover 300 of the laboratory animal breeding apparatus 100 according to an exemplary embodiment in the present disclosure.

The air flow portions 350 may be connected to an air supply source (not shown) or an air discharge source (not shown).

The case 300 may have two air flow portions 350 formed thereon as illustrated in FIG. 2. One of the two air flow portions 350 may be connected to the air supply source, and the other may also be connected to the air discharge source.

Fresh air of the air supply source may flow into the air flow portion 350 connected to the air supply source. Therefore, fresh air may be supplied to the breeding space CB of the case 200.

Contaminated air, with which a carbon dioxide or the like generated by respiration or the like of an experimental animal in the breeding space CB is mixed, may flow into the air flow portion 350 connected to the air discharge source. The contaminated air flowing into the air flow portion 350 may be discharged to the air discharge source through the other air flow portion 350.

Therefore, air may be circulated in the breeding space CB of the case 200 and thus an experimental animal may be bred in a pleasant environment.

As respectively illustrated in FIGS. 8 and 9, a flow-hole 351 may be formed in the air flow portion 350. A valve 500 opening and closing the flow-hole 351 may be provided in the flow-hole 351 of the air flow portion 350.

The valve 500 may include a movable opening and closing member 510. The movable opening and closing member 510 may be movably provided in the flow-hole 351 to open and close the flow-hole 351.

The movable opening and closing member 510 may include an opening and closing portion 511 and a movable portion 512. The opening and closing portion 511 may open and close the flow-hole 351. The opening and closing portion 511 may have a truncated cone or circular cone shape. Therefore, the movable opening and closing member 510 may allow the flow-hole 351 of the air flow portion 350 to be easily opened and closed.

The movable portion 512 of the movable opening and closing member 510 may be movably provided in the flow-hole 512.

A guide portion 352 may be provided in the flow-hole 351 as respectively illustrated in FIGS. 8 and 9. The guide portion 352 may have a guide hole 352a and an air cavity 352b formed therein.

The aforementioned movable opening and closing member 510, that is, the movable portion 512 of the movable opening and closing member 510, may be inserted into the guide hole 352a. This may allow movement of the movable opening and closing member 510 in the flow-hole 351 to be guided.

Air may also pass through the air cavity 352b. Therefore, when the flow-hole 351 of the air flow portion 350 is opened by the movable opening and closing member 510, air supplied to the flow-hole 351 from the air supply source may pass through the air cavity 352b of the guide portion 352 to flow into the breeding space CB of the case 200, or contaminated air in the breeding space CB may flow into the flow-hole 351 and then pass through the air cavity 352b of the guide portion 352, thereby being discharged to the air discharge source, as illustrated in FIG. 9.

The valve 500 may further include a guide member 520 and an elastic member 530 in addition to the aforementioned movable opening and closing member 510.

The guide member 520 may have a fitting hole 521 and an air hole 522 formed therein.

An end portion of the movable opening and closing member 510, that is, an end portion of the movable portion 512 of the movable opening and closing member 510, may be fitted in the fitting hole 521 of the guide member 520. For example, the end portion of the movable opening and closing member 510 may be fitted in the fitting hole 521 by a fitting assist member 540.

Therefore, the guide member 520 may move in the flow-hole 351 of the air flow portion 350 along with the movable opening and closing member 510 in response to movement of the movable opening and closing member 510.

Air may pass through the air hole 522 of the guide member 520. Therefore, when the flow-hole 351 is opened by the movable opening and closing member 510, air supplied to the flow-hole 351 from the air supply source may pass through the air hole 522 of the guide member 520 to flow into the breeding space CB of the case 200, or air in the breeding space CB may flow into the flow-hole 351 and then pass through the air hole 522 of the guide member 520, thereby being discharged to the air discharge source.

The elastic member 530 may be provided between the guide portion 352 and the guide member 520. As long as an external force does not act on the movable opening and closing member 510, the elastic member 530 may provide elastic force to the guide member 520 such that the movable opening and closing member 510 may closes the flow-hole 351.

Meanwhile, a linking portion C provided on an air conditioning system (not shown) including an air supply source and an air discharge source may be inserted into the flow-hole 351 of the air flow portion 350.

The linking portion C, for example, a portion thereof, may have a tubular shape. The air conditioning system may also include a linking portion C connected to the air supply source and a linking portion C connected to the air discharge source, that is, all the two linking portions C.

The linking portion C connected to the air supply source may be inserted into the flow-hole 351 of one of the two air flow portions 350, and the linking portion C connected to the air discharge source may be inserted into the flow-hole 351 of the other air flow portion 350.

When the linking portion C is inserted into the flow-hole 351 of the air flow portion 350 as illustrated in FIG. 9, the linking portion C may push the guide member 520 of the valve 500. Therefore, the movable opening and closing member 510 may move against the elastic force of the elastic member 530 such that the flow-hole 351 may be opened.

This may allow fresh air supplied from the air supply source of the air conditioning system to flow into the breeding space CB of the case 200 by flowing into the flow-hole 351 of the air flow portion 350 while passing through the linking portion C connected to the air supply source, and through the air hole 522 of the guide member 520 and the air cavity 352b of the guide portion 352 as illustrated in FIG. 9.

Contaminated air present in the breeding space CB may flow into the flow-hole 351 of the other air flow portion 350, may flow into the flow-hole 351 of the air flow portion 350 while passing through the air cavity 352b of the guide portion 352 and the air hole 522 of the guide member 520, and thus may flow into the air discharge source of the air conditioning system connected to the linking portion C through the linking portion C insertedly connected to the flow-hole 351 of the air flow portion 350.

As respectively illustrated in FIG. 2, a first magnetic force generating member 353 generating magnetic force may be provided in the air flow portion 350. A second magnetic force generating member M corresponding to the first magnetic force generating member 353 may be provided in the linking portion C of the air conditioning system in a position corresponding to a position of the first magnetic force generating member 353.

Therefore, as illustrated in FIGS. 8 and 9, magnetic forces of the first magnetic force generating member 353 (see FIG. 2) and the second magnetic force generating member M (see FIG. 2) may allow the flow-hole 351 of the air flow portion 350 and the linking portion C of the air conditioning system to be easily arranged, and may allow the linking portion C of the air conditioning system to be readily inserted into the flow-hole 351 of the air flow portion 350.

Although it has been described that the air flow portion 350 connected to the air supply source or air discharge source may be formed on the cover 300, the air flow portion 350 connected to the air supply source or air discharge source may even be formed on the case 200.

Feed Container

The laboratory animal breeding apparatus 100 according to an exemplary embodiment in the present disclosure may further include the feed container 600.

The feed container 600 may be provided in the breeding space CB to be spaced apart from a bottom surface of the case 200 by a predetermined interval. An experimental animal feed may be inserted into the feed container 600.

The feed container 600 may be provided below the opening portion 310 of the cover 300.

At least a portion of the feed container 600 may also have a mesh form. Therefore, an experimental animal may eat a feed contained in the feed container 600 through a mesh of the feed container 600.

A cross section of the feed container 600 may also have a quadrangular shape having a wide upper end and a narrow lower end. This may allow a plurality of feed containers 600 to be easily stacked for storage. For example, a feed container 600 may be inserted into another feed container 600 such that a plurality of feed containers 600 may be readily stacked.

The upper end portion of the feed container 600 may be installed on the opening portion 310 of the cover 300. To this end, the holding portions 610 may be formed on the upper end portion of the feed container 600. The holding portions 610 of the feed container 600 may be hung on the aforementioned grooves 312 formed in the opening portion 310 of the cover 300, respectively.

Using the feed container 600 having such a configuration may allow the feed container 600 to be easily separated from the opening portion 310 after the filter 400 is separated from the opening portion 310 of the cover 300 as illustrated in FIG. 12.

As such, by separating the feed container 600 from the opening portion 310 of the cover 300, an experimental animal in the breeding space CB of the case 200 may be removed from the breeding space CB, an experimental animal may be easily inserted into the breeding space CB, or an experimental animal in the breeding space CB may be treated.

Meanwhile, as illustrated in FIG. 13, the feed container 600 may include the horizontally-extending portion 620 provided thereon and extending from the upper end portion of the feed container 600. As illustrated in FIG. 13, the feed container 600 may also further include the vertically-extending portion 630 extending vertically from the horizontally-extending portion 620. This may allow an experimental animal to eat a feed contained in the feed container 600 only through the mesh of the feed container 600 without entering the feed container 600.

As such, the upper end portion of the feed container 600 including the horizontally-extending portion 620 and the vertically-extending portion 630, and the horizontally-extending portion 620 may be installed on the upper end portion of the case 200. To this end, the holding portions 610 may be formed on the upper end portion of the feed container 600, and on the horizontally-extending portion 620. The holding portions 610 of the feed container 600 and the horizontally-extending portion 620 may be hung on the aforementioned grooves 210 formed in the upper end portion of the case 200.

In order to install the feed container 600 including the horizontally-extending portion 620 and the vertically-extending portion 630 on the upper end portion of the case 200, the cover 300 should be separated from the case 200 as illustrated in FIG. 14.

As set forth above, according to exemplary embodiments in the present disclosure, use of the laboratory animal breeding apparatus may allow an experimental animal to remain alive even when air conditioning equipment or the like circulating air to keep air contained in the breeding space of the laboratory animal breeding apparatus fresh does not work, may allow an experimental animal to be easily inserted into or removed from the laboratory animal breeding apparatus, or to be readily treated, may allow the laboratory animal breeding apparatus to be easily connected to an air conditioning system or the like, and may allow a feed container having various shapes to be provided in the laboratory animal breeding apparatus.

The laboratory animal breeding apparatus as described above is not limited to the configurations of the embodiments, and the embodiments may be configured with a selective combination of the whole or a part of the respective embodiments such that various modifications thereof may be made.

While exemplary embodiments have been shown and described above, it will be apparent to those skilled in the art that modifications and variations could be made without departing from the scope of the present invention as defined by the appended claims.

What is claimed is:

1. A laboratory animal breeding apparatus comprising:
a case having a breeding space in which an experimental animal is bred;
a cover covering an open upper portion of the case; and
a filter separably provided on an opening portion formed in the cover or the case, for purifying air flow into the breeding space,
wherein the filter is rotatably provided on the opening portion,
wherein the filter comprises:
a first filter support member rotatably and separably provided on the opening portion;
a second filter support member below the first filter support member; and
a filter member between the first and second filter support members,
wherein the second filter support member is rotatably provided on the first filter support member,
wherein the first filter support member has an insertion portion formed on a lower portion thereof such that the second filter support member is inserted into the insertion portion to overlay the first filter support member through being revolved,
the first filter support member has an opening portion fastening member formed outside of the insertion portion thereof, for sealing a space between the first filter support member and the opening portion,
wherein the opening portion fastening member is provided on the first filter support member to pass through at least a portion of the first filter support member,
wherein the first filter support member has through holes formed outside of the insertion portion thereof, and the opening portion fastening member comprises:
an upper fastening portion provided on an upper portion of the first filter support member;
a lower fastening portion provided on a lower portion of the first filter support member; and
connection portions connected to the upper and lower fastening portions, respectively, and passing through the holes, respectively.

2. The laboratory animal breeding apparatus of claim 1, wherein the first and second filter support members have passage holes through which air passes, respectively.

3. The laboratory animal breeding apparatus of claim 1, wherein the cover has a water supply portion formed therein such that a water bottle is inserted into the water supply portion to supply water to an experimental animal.

4. The laboratory animal breeding apparatus of claim 3, wherein the water supply portion has a water supply hole formed therein such that a water injection nozzle of the water bottle is inserted into the water supply hole, and the water supply portion adjacent to the water supply hole has a rotary opening and closing member rotatably provided thereon to open and close the water supply hole.

5. The laboratory animal breeding apparatus of claim 4, wherein the water supply portion adjacent to the water supply hole has an elastic member provided thereon to provide elastic force to the rotary opening and closing member.

6. The laboratory animal breeding apparatus of claim 4, wherein the water bottle adjacent to the water injection nozzle has a gap sealing member provided on a portion of the water bottle to seal a gap between the water injection nozzle and the water supply hole when the water injection nozzle is inserted into the water supply hole.

7. The laboratory animal breeding apparatus of claim 1, wherein the cover or the case has clamping members rotatably provided thereon to couple the cover to the case.

8. The laboratory animal breeding apparatus of claim 7, wherein the case and the cover has a sealing member provided therebetween.

9. The laboratory animal breeding apparatus of claim 1, wherein the cover or the case has an air flow portion connected to an air supply source or an air discharge source to supply fresh air to the breeding space or discharge contaminated air in the breeding space.

10. The laboratory animal breeding apparatus of claim 9, wherein the air flow portion is formed in the cover.

11. The laboratory animal breeding apparatus of claim 10, wherein the air flow portion has a flow-hole, and the flow-hole has a valve opening and closing the flow-hole.

12. The laboratory animal breeding apparatus of claim 11, wherein the valve has a movable opening and closing member movably provided in the flow-hole to open and close the flow-hole.

13. The laboratory animal breeding apparatus of claim 12, wherein the movable opening and closing member comprises an opening and closing portion opening and closing the flow-hole, and a movable portion movably provided in the flow-hole.

14. The laboratory animal breeding apparatus of claim 13, wherein the opening and closing portion has a truncated cone or circular cone shape.

15. The laboratory animal breeding apparatus of claim 12, wherein the flow-hole has a guide hole into which the movable opening and closing member is inserted to guide movement of the movable opening and closing member, and a guide portion having an air cavity through which air passes.

16. The laboratory animal breeding apparatus of claim 15, wherein the valve further comprises: a guide member having a fitting hole in which an end portion of the movable opening and closing member is fitted, and air holes through which air passes; and an elastic member between the guide portion and the guide member.

17. The laboratory animal breeding apparatus of claim 11, wherein the flow-hole has a linking portion inserted thereinto, the linking portion provided on an air conditioning system including the air supply source and the air discharge source.

18. The laboratory animal breeding apparatus of claim 17, wherein the air flow portion has a first magnetic force generating member generating magnetic force, and the linking portion in a location corresponding to a location of the first magnetic force generating member has a second magnetic force generating member corresponding to the first magnetic force generating member.

19. The laboratory animal breeding apparatus of claim 1, further comprising a feed container provided in the breeding space and spaced apart from a bottom surface of the case at a predetermined interval for contining an experimental animal feed.

20. The laboratory animal breeding apparatus of claim 19, wherein the feed container is provided below the opening portion.

21. The laboratory animal breeding apparatus of claim 20, at least a portion of the feed container has a mesh form.

22. The laboratory animal breeding apparatus of claim 20, wherein a cross section of the feed container has a quadrangular shape having a wide upper end and a narrow lower end.

23. The laboratory animal breeding apparatus of claim 20, wherein an upper end portion of the feed container is installed on the opening portion.

24. The laboratory animal breeding apparatus of claim 23, wherein the upper end portion of the feed container has holding portions, and the opening portion has grooves on which the holding portions are hung.

25. The laboratory animal breeding apparatus of claim 20, wherein the feed container has a horizontally-extending portion extending horizontally from the upper end portion of the feed container, and a vertically-extending portion extending vertically from the horizontally-extending portion.

26. The laboratory animal breeding apparatus of claim 25, wherein the upper end portion and horizontally-extending portion of the feed container are installed on an upper end portion of the case.

27. The laboratory animal breeding apparatus of claim 26, wherein the upper end portion and horizontally-extending portion of the feed container have holding portions, respectively, and the upper end portion of the case has insertion grooves on which the holding portions are respectively hung.

* * * * *